United States Patent
McGeehin et al.

(10) Patent No.: US 10,192,577 B1
(45) Date of Patent: Jan. 29, 2019

(54) WRITE POLE COATING LAYER

(71) Applicant: Seagate Technology LLC, Cupertino, CA (US)

(72) Inventors: Peter Kevin McGeehin, Donegal (IE); Mark Anthony Gubbins, Donegal (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/835,808

(22) Filed: Dec. 8, 2017

Related U.S. Application Data (60) Provisional application No. 62/431,548, filed on Dec. 8, 2016.

(51) Int. Cl.
*G11B 5/00* (2006.01)
*G11B 5/855* (2006.01)
*G11B 5/65* (2006.01)

(52) U.S. Cl.
CPC .............. *G11B 5/855* (2013.01); *G11B 5/653* (2013.01); *G11B 2005/0008* (2013.01); *G11B 2005/0016* (2013.01)

(58) Field of Classification Search
CPC ............ G11B 27/36; G11B 2005/0021; G11B 2005/0005; G11B 5/314

USPC .......... 360/59, 328; 369/13.13, 13.14, 13.33, 369/13.34

See application file for complete search history.

(56) References Cited

U.S. PATENT DOCUMENTS

| 8,824,086 B2 * | 9/2014 | Peng | G11B 5/3133 |
| | | | 360/59 |
| 8,923,100 B1 * | 12/2014 | Wessel | G11B 5/6088 |
| | | | 369/112.27 |
| 8,947,986 B1 * | 2/2015 | Araki | G11B 5/314 |
| | | | 369/112.27 |

\* cited by examiner

*Primary Examiner* — Nabil Z Hindi
(74) *Attorney, Agent, or Firm* — Hollingsworth Davis, LLC (57) ABSTRACT

An apparatus comprises a slider having a media-facing surface and that is configured for heat-assisted magnetic recording. The slider comprises a write pole, a heatsink layer, and a diffusing metal. The write pole includes two or more sides extending into the slider and a pole tip at the media-facing surface. The heatsink layer is proximate at least part of the two or more sides of the write pole, and a first portion of the heatsink layer is proximate the pole tip. The diffusing metal is disposed proximate the write pole.

20 Claims, 6 Drawing Sheets

WRITE POLE COATING LAYER

RELATED PATENT DOCUMENTS

This application claims the benefit of Provisional Patent Application No. 62/431,548 filed on Dec. 8, 2016, which is incorporated herein by reference in its entirety.

SUMMARY

Embodiments of the disclosure are directed to an apparatus comprising a slider having a media-facing surface that is configured for heat-assisted magnetic recording. The slider comprises a write pole, a heatsink layer, and a diffusing metal. The write pole includes two or more sides extending into the slider and a pole tip at the media-facing surface. The heatsink layer is proximate at least part of the two or more sides of the write pole, and a first portion of the heatsink layer is proximate the pole tip. The diffusing metal is disposed proximate the write pole.

Further embodiments are directed to an apparatus comprising a slider having a media-facing surface that is configured for heat-assisted magnetic recording. The slider comprises a write pole including two or more sides extending into the slider and a pole tip at the media-facing surface. A heatsink layer is proximate at least part of the two or more sides, where a first portion of the heatsink layer is proximate the pole tip. The slider further includes a diffusing metal disposed proximate the write pole, and a barrier layer on the media-facing surface. The barrier layer covers at least one of the first portion of the heatsink layer and the pole tip.

Additional embodiments are directed to an apparatus comprising a slider having a media-facing surface that is configured for heat-assisted magnetic recording. The slider comprises a write pole including two or more sides extending into the slider and a pole tip at the media-facing surface. A coating layer comprising a diffusing metal is disposed on at least part of the two or more sides, where a first portion of the coating layer comprises a blocking material and is disposed proximate the pole tip. A heatsink layer surrounds the coating layer and the write pole. The slider further includes a protective coating covering at least a portion of the media-facing surface, wherein the protective coating degrades during operation of the slider exposing the pole tip and heatsink layer. A barrier layer on the media-facing surface covers the exposed pole tip.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature (TO and having dimensions less than 100 nm (e.g., ~50 nm).

The heat generated during write operations can cause portions of the media-facing surface, typically portions near the NFT and write pole, to expand. These temperatures are also greater than the temperature at which the slider protective overcoat degrades. For example, diamond-like carbon (DLC), a typical overcoat material, degrades at about 135-150° C. While the degradation temperature is dependent upon the thickness of the overcoat, the overcoat thicknesses for HAMR sliders are significantly less than previous thicknesses. The overcoat thickness for magnetic recording sliders used to be greater than 20 Å. However, due to the reduced head-media spacing utilized in HAMR, the slider overcoat is no more than 20 Å, and likely, no more than 15 Å. The reduced overcoat thickness, combined with the increased temperatures during writing operations, degrades the protective overcoat layer proximate the write pole leaving the write pole exposed to the environment. The heat and oxygen in that environment lead to thermal oxidation of the exposed components, e.g., the write pole, at the media-facing surface. The oxidation collects at the media surface (e.g., up to tens of nm thick) leading to protrusion, mechanical engagement with the recording medium, and generation of electrical noise. In addition, iron diffusing from the write pole tip toward the oxygen source reduces the magnetic saturation of the write pole, thereby reducing the magnetic moment and writing accuracy. Reduction of thermal oxidation of materials at the media-facing surface would increase the operating life of the head.

There are alternative ways to limit thermal oxidation at the media-facing surface, such as, reducing drive operation temperatures, reducing the amount of oxygen at the media-facing surface, and the addition of barrier layers to prevent the presence of oxygen at the surface of materials comprising the components at the media-facing surface. Embodiments herein are directed to a diffusing material proximate the write pole that forms a self-passivating layer at the media-facing surface when exposed to the writing operation environment.

Figure 1:
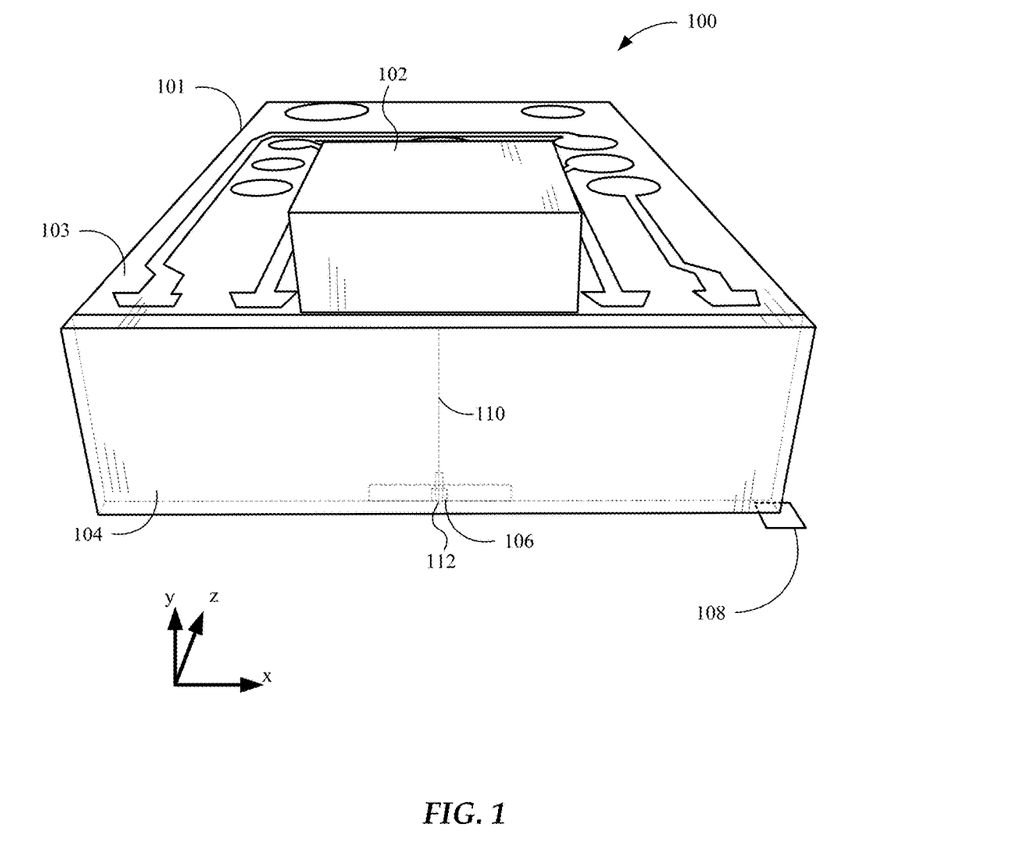
FIG. 1 is a perspective view of a HAMR slider assembly according to embodiments discussed herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media facing surface 108 faces, and is held proximate to, the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
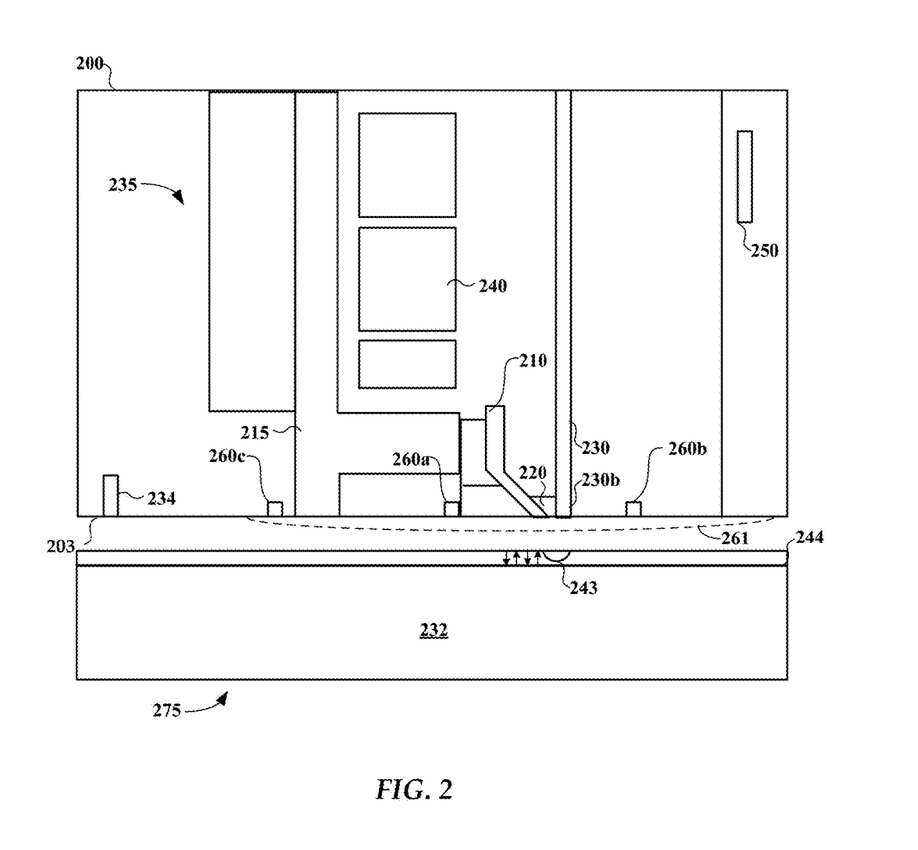
FIG. 2 is a cross-sectional view of a slider assembly according to embodiments discussed herein.

In FIG. 2, a cross-section diagram shows a slider 200 according to various embodiments. The head transducer 200 is shown positioned over a writeable medium 275 (e.g., magnetic disk) that generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicated by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or differential-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220. Thermal sensor 260b may be referred to as a leading sensor as it will pass over the media prior to the NFT and write pole. A thermal sensor may also be located proximate the reader if used primarily for thermal asperity detection.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, detecting contact with the recording medium, and/or monitoring the power of the laser diode. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

One type of contamination that develops on a HAMR head after periods of writing operation is thermal oxidation of materials at the media-facing surface. The heat generated during operation of the HAMR head is a driver to thermal oxidation of the write pole and other materials exposed at the media-facing surface such as a coating layer disposed on, and proximate, the write pole. Since the HAMR head protective coating (e.g., DLC) burnishes off at high operating temperatures, the lack of DLC protection exposes the write pole and proximate components to oxygen and heat—prerequisites for thermal oxidation. This leads to write pole oxidation at the media-facing surface as iron from the write pole (e.g., a CoFe write pole) diffuses to the write pole media-facing surface to pick up oxygen in the operating environment and oxidize in the high temperature. Components proximate the write pole, such as a heatsink and/or write pole coating layer, may also experience thermal oxidation. Introduction of a material to one or more of these components that generates its own barrier layer in the operating environment reduces and/or terminates thermal oxidation of these components.

Figure 3A:
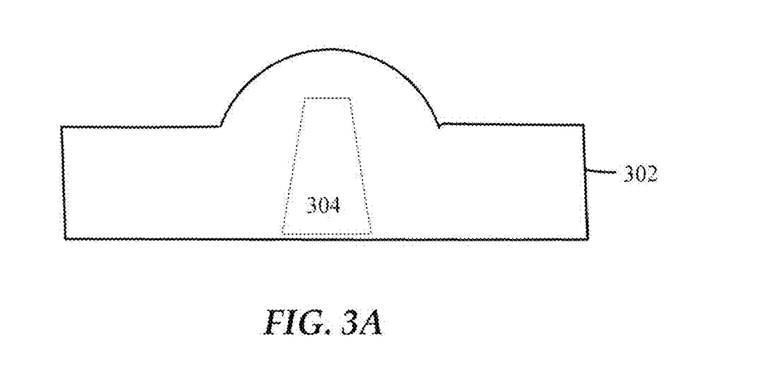
FIG. 3A is a front view, from the media-facing surface, of a write pole and heatsink layer according to embodiments discussed herein.
Figure 3B:
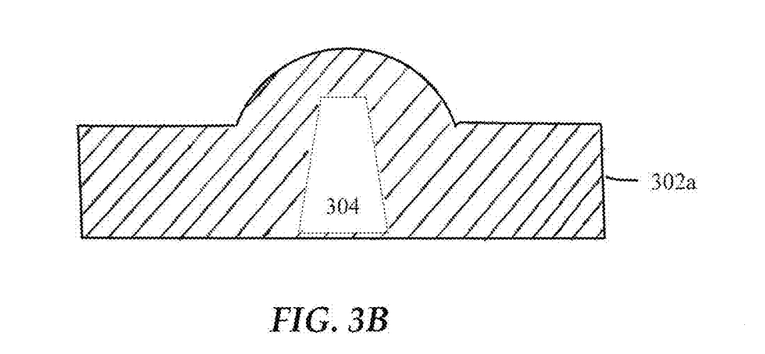
FIG. 3B is a front view, from the media-facing surface, of a write pole and heatsink layer with a barrier layer according to embodiments discussed herein.
Figure 3C:
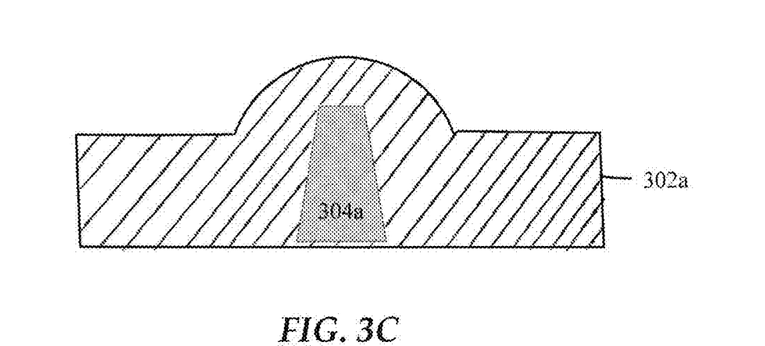
FIG. 3C is a front view, from the media-facing surface, of a write pole and heatsink layer with a barrier layer according to embodiments discussed herein.

In FIGS. 3A-C, a cross-section of the write pole tip at the media-facing surface is shown. While the cross-section has a trapezoidal shape, the write pole tip can have any variety of shapes at the media-facing surface. The write pole 304 is surrounded by a heatsink layer 302 coating the write pole 304. The write pole 304 is comprised of a magnetic material comprising at least one of CoFe, CoNiFe, and NiFe. The heatsink layer 302 is shown as surrounding the write pole 304; however, the heatsink layer 302 can be disposed on two or more sides of the write pole 304, depending on the shape of the write pole 304. The heatsink layer comprises one or more inert metals such as ruthenium, rhodium, and irridium, or alloys thereof, along with a diffusing metal. The diffusing metal comprises a metal that readily reacts with oxygen to form a continuous oxide layer that leads to passivation of the material underneath such as at least one of aluminum, chromium, titanium, tantalum, and vanadium. For example, the heatsink layer comprises about 5-10%, or in certain embodiments, no more than 5% of the diffusing metal. As the protective coating on the media-facing surface (e.g., DLC) degrades, the heatsink layer 302 and write pole 304 are exposed to the recording environment (e.g., heat and oxygen).

FIG. 3B illustrates a barrier layer 302a formed over the exposed heatsink layer 302. Thermal oxidation causes the diffusing metal to diffuse from the heatsink layer 302 to the media-facing surface forming a barrier layer 302a. The thermal oxidation continues at the write pole 304 causing iron to diffuse to the media-facing surface of the write pole 304. For example, $Fe_2O_3$ can form on the media-facing surface of the write pole 304. As the iron diffuses from the write pole tip to the media-facing surface, magnetic saturation of of the write pole tip is diminished—the magnetic moment is lost. Adding a diffusing metal (e.g., aluminum) to the heatsink layer (e.g. ruthenium) 302, leads to the aluminum diffusing from the bulk of the heatsink layer to the media-facing surface of the heatsink layer and forming a protective barrier 302a (e.g., alumina ($Al_2O_3$)). The heatsink layer 302 is then protected from further thermal oxidation by this self-passivating barrier layer 302a. In certain embodiments, the materials of the barrier layer respond better in hotter temperatures and/or in the presence of more oxygen, therefore forming a better barrier layer in worse conditions.

Once the barrier layer 302a is formed over the heatsink layer 302 at the media-facing surface, no further aluminum diffusion occurs toward the media-facing surface of the heatsink layer 302. Instead, the aluminum from the heatsink layer 302 diffuses from the heatsink layer 302 through the write pole 304 (e.g., CoFe) to the media-facing surface of the write pole 304. FIG. 3C shows that further exposure to heat and oxygen causes a protective barrier layer 304a of $Al_2O_3$ to form on the media-facing surface of the write pole 304 as well. Formation of the barrier layers 302a and 304a prevents further exposure of the heatsink layer 302 and write pole 304 to the oxygen of the operating environment. The barrier layers can achieve a thickness of about 1-5 nm, or in certain embodiments a thickness of about 3-5 nm. By alloying the heatsink layer material with a diffusing metal, both the heatsink layer and components proximate the heatsink layer are protected from thermal oxidation. Thus, the oxidation of the write pole 304 and heatsink layer 302 ends, and the barrier layers 302a and 304a are self-passivating.

Protection of a material from thermal oxidation is accomplished by doping the material with another material (e.g., with aluminum) that diffuses to an oxygen source. In a HAMR slider, this means diffusing to the media-facing surface and forming a protective barrier layer (e.g., of alumina). As shown below in FIGS. 4-5, thermal diffusion of the doping material (e.g., aluminum) occurs from the heatsink layer to an adjacent material—the write pole. The doping material is drawn to the oxygen source, even diffusing through neighboring materials to reach it.

Figure 4:
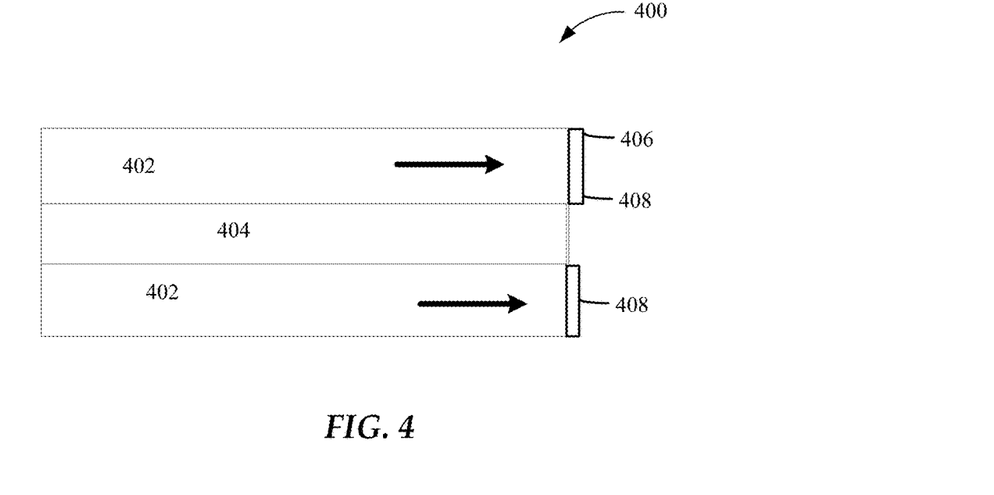
FIG. 4 is a cross-sectional view of a write pole and a heatsink layer with a barrier layer according to embodiments discussed herein.

FIG. 4 is a cross-section of a portion of a HAMR slider 400. The media-facing surface of the slider 400 is indicated by reference numeral 406. The write pole 404 is at least partially surrounded on two sides by a heatsink layer 402. In certain embodiments, the write pole 404 comprises CoFe and the heatsink layer 402 comprises a RuAl alloy comprising about 5% aluminum. When exposed to the heat and oxygen of the writing environment (e.g., after the protective DLC degrades), the aluminum diffuses from the bulk of the heatsink layer 402 toward the media-facing surface 406 as indicated by the arrows in the heatsink layer 402. The aluminum then oxidizes at the media-facing surface 406 to form a barrier layer 408 of alumina. The heatsink layer 402 is protected from further thermal oxidation by this self-passivating barrier layer 408.

Figure 5:
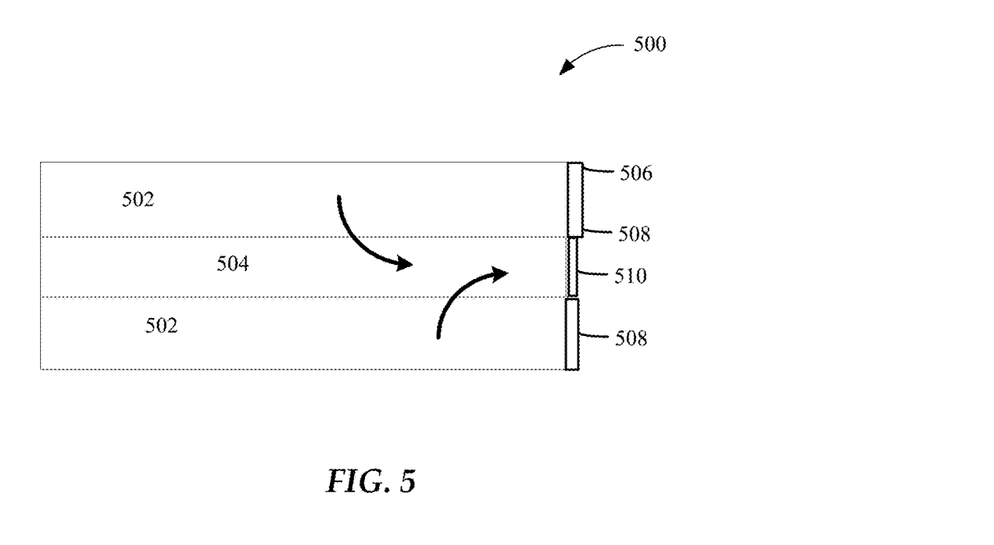
FIG. 5 is a cross-sectional view of a write pole and a heatsink layer with a barrier layer according to embodiments discussed herein.

FIG. 5 is a cross-section of a portion of a HAMR slider 500 similar to that of FIG. 4. The media-facing surface of the slider 500 is indicated by reference numeral 506. The write pole 504 is at least partially surrounded on two sides by a heatsink layer 502. In certain embodiments, the write pole 504 comprises CoFe and the heatsink layer 502 comprises a RuAl alloy comprising about 5% aluminum. Once a barrier layer 508 forms on the media-facing surface of the heatsink layer, the aluminum stops diffusing to the media-facing surface of the heatsink layer 502. Instead, the aluminum diffuses from the heatsink layer 502 into the write pole 504 and further diffuses to the media-facing surface of the write pole 504 as indicated by the arrows originating in the heatsink layer 502. There, the aluminum oxidizes to form an additional barrier layer 510 over the media-facing surface of the write pole 504. Thus, alloying one slider component with a diffusing material provides protection for two, or more, proximate components at the media-facing surface.

In alternative embodiments, the diffusing material is disposed as a discrete coating layer on the write pole. The heatsink layer is then disposed on the coating layer and on portions of the write pole not covered by the coating layer. The coating layer of diffusing material is discussed further below in FIGS. 6A-B.

Figure 6A:
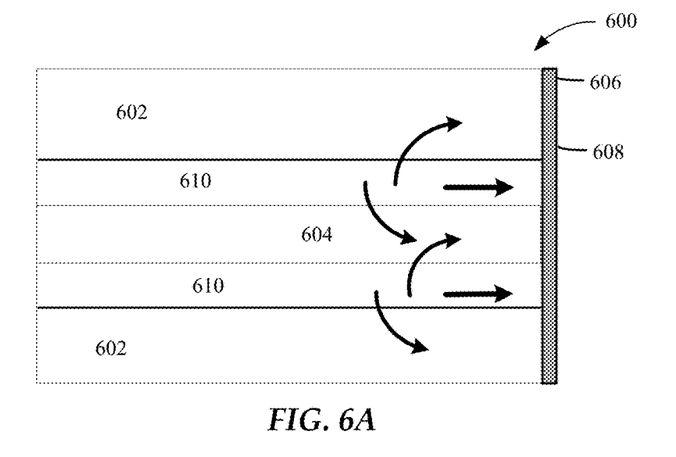
FIG. 6A is a cross-sectional view of a write pole, heatsink layer, and coating layer with a barrier layer according to embodiments discussed herein.

FIG. 6A is a cross-section of a portion of a HAMR slider 600. The media-facing surface of the slider 600 is indicated by reference numeral 606. The write pole 604 is at least partially surrounded on two sides by a coating layer 610. The coating layer 610 is at least partially surrounded (shown as being covered on at least two sides) by heatsink layer 602. In certain embodiments, the write pole 604 comprises CoFe, the coating layer 610 comprises aluminum, and the heatsink layer 602 comprises ruthenium. When exposed to the heat and oxygen of the writing environment (e.g., after portions of the protective DLC degrade), the aluminum diffuses from the coating layer 610 toward the media-facing surface 606 as indicated by the arrows in the coating layer 610. The aluminum then oxidizes at the media-facing surface 606 to form a barrier layer 608 of alumina. While the barrier layer 608 is shown as being evenly distributed at the media-facing surface 606, the aluminum may diffuse unevenly, forming an uneven alumina layer at the media-facing surface 606.

In certain embodiments, the DLC degrades at different rates over different components. Using FIG. 6A as an example, the write pole 604 achieves the highest temperatures of the illustrated components during writing. Due to the heat as well as the duress the write pole materials experience during writing due to protrusion of the media-facing surface (e.g., the write pole tends to be a close point with the recording medium), the protective coating over the write pole 604 degrades prior to other areas of the media-facing surface. Conversely, since the heatsink layer 602 maintains a lower temperature, the protective layer over the heatsink layer 602 remains longer. When the protective coating over the write pole 604 degrades first and exposes the write pole materials to the oxygen and heat of the writing environment, the diffusing material diffuses toward the media-facing surface 606 of the write pole 604 first. Once the barrier layer 608 is formed over the write pole 604, the diffusing material will diffuse toward the oxygen at the media-facing surface of other components (e.g., the heatsink layer 602) which subsequently lose protection from thermal oxidation when their portions of the protective layer degrades. As those components are protected from further thermal oxidation by a barrier layer being formed, the diffusing material will continue to seek out exposed portions of the media-facing surface 606 and fill in the rest of the barrier layer 608 at least for components proximate the coating layer 610. The previously exposed slider components are then protected from further thermal oxidation by this self-passivating barrier layer 608.

In certain embodiments, the topography of the media-facing surface 606 is uneven. This may occur due to the varying hardness of the respective materials used for different components at the media-facing surface. For example, ruthenium is harder than CoFe and aluminum. During slider manufacturing, the media-facing surface is lapped, and the different materials respond differently based, at least in part, on their respective hardness. Thus, the media-facing surface can be uneven, with different components being recessed as compared with other components at the media-facing surface. The protective coating (e.g., DLC) is applied to the uneven topography of the media-facing surface and in certain embodiments, provides a more even media-facing surface. However, as the protective coating degrades, the uneven media-facing surface topography is exposed.

Figure 6B:
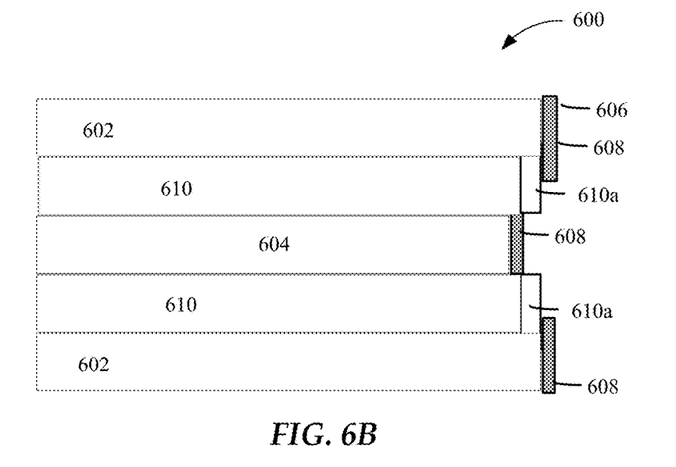
FIG. 6B is a cross-sectional view of a write pole, heatsink layer, and coating layer with a barrier layer according to embodiments discussed herein.

Similar to FIG. 6A, FIG. 6B is a cross-section of a portion of a HAMR slider 600. However, the media-facing surface 606 in FIG. 6B is uneven (e.g., different components have different elevations). As shown, the media-facing surface of the coating layer 610 is recessed from the media-facing surface of the heatsink layer 602. Also, the media-facing surface of the write pole 604 is recessed even further than that of the coating layer 610. In certain embodiments, the diffusing material may diffuse directly to the media-facing surface 606 forming a protrusion at the media-facing surface of the coating layer 610. Also, due to recession of various components, the barrier layer 608 may not form evenly, or at all, along the media-facing surface 606. As discussed above in connection with FIG. 6A, the barrier layer 608 may first form over the write pole 604 due to the heat of the write pole 604 causing the protective layer to degrade there first.

In certain embodiments, the coating layer 610 further comprises a first portion comprising the diffusing material and a second portion 610a, proximate the media-facing surface 606, comprising a blocking material. The blocking material prevents the diffusing material from diffusing directly to the media-facing surface 606 (e.g., as shown by the horizontal arrows in FIG. 6A). The blocking material comprises at least one of ruthenium, rhodium, and irridium, or alloys thereof. For example, the blocking material may be an extension of the heatsink layer 602 that wraps over the end of the coating layer 610. This can be formed through masking of the wafer when depositing the heatsink layer 602. When the blocking material is present, the diffusing material diffuses toward the media-facing surface of the write pole 604, as discussed above, forming a barrier layer 608 to protect the write pole first. As the protective layer proceeds to degrade over other components at the media-facing surface 606 (e.g., heatsink layer 602), the barrier layer 608 continues to form over the heatsink layer 602 and coating layer 610/610a to form a continuous barrier layer 608. The barrier layer 608 may have a consistent thickness (e.g., up to 5 nm) or may have a varying thickness with respect to the respective recessions of the various components at the media-facing surface 606.

In addition to protecting components from thermal oxidation, the barrier layers reduce corrosive effects. When the heatsink layer and the write pole comprise materials far apart in the electrochemical series, there may be galvanic coupling. For example, when the heatsink layer comprises the more noble ruthenium (higher in electrochemical series) and is in contact with a write pole comprising the less noble CoFe (both Co and Fe are lower in the electrochemical series), there may be a galvanic couple in operation. When two materials that are spaced apart in the electrochemical series are in electrical contact and both are exposed to the same environment (e.g., at the media-facing surface), the more noble material (e.g., Ru coating layer) can increase the corrosion rate of the less noble material (e.g., CoFe write pole). Addition of a diffusing metal (e.g., Al) to the Ru heatsink layer makes the new material (e.g., RuAl) less noble and decreases the driving force of the galvanic couple (e.g., decreases the galvanic effect). In addition, formation of the barrier layer over both the heatsink layer and the write pole at the media-facing surface prevents thermal oxidation and removes one of the conditions necessary for a galvanic couple to exist. The barrier layer prevents exposure of both the nobler heatsink layer and less noble write pole to the HAMR drive environment thereby reducing the effects of both oxidation and galvanic corrosion.

Figure 7A:
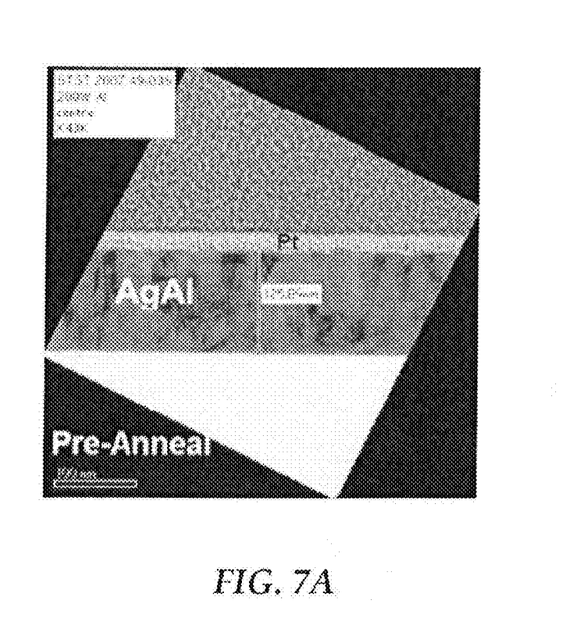
FIG. 7A is a cross-sectional scan of an aluminum doped material prior to an annealing process according to embodiments discussed herein.
Figure 7B:
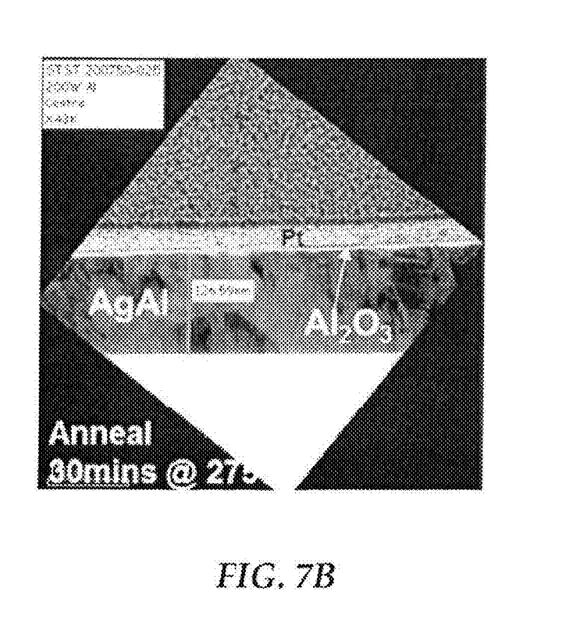
FIG. 7B is a cross-sectional scan of an aluminum doped material with a barrier layer formed after an annealing process according to embodiments discussed herein.

FIGS. 7A-B illustrate the formation of an alumina barrier layer after exposure of an alloy layer to an annealing process. FIG. 7A shows an aluminum doped silver layer (AgAl) proximate a platinum layer prior to annealing. The AgAl layer has an aluminum content of 5 at. % and a thickness of 125.89 nm. FIG. 7B shows the same structure after a thirty minute anneal at 275° C. As shown by the arrow, a barrier layer having uniform thickness of alumina forms on the surface of the AgAl layer, between the AgAl layer and the platinum layer. After formation of the barrier layer, the AgAl layer (including the barrier layer) has a thickness of 126.59 nm. Such conditions and dimensions are comparable to those of slider writing operations. Thus, similar results can be achieved with the materials used in HAMR slider components. For example, an alumina layer of about 2-3 nm can be formed when aluminum is disposed proximate a CoFe write pole in a slider.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An apparatus, comprising:
a slider having a media-facing surface and configured for heat-assisted magnetic recording, the slider comprising:
   a write pole including two or more sides extending into the slider and a pole tip at the media-facing surface;
   a heatsink layer proximate at least part of the two or more sides where a first portion of the heatsink layer is proximate the pole tip; and
   a diffusing metal disposed proximate the write pole and configured to diffuse through the write pole toward the media-facing surface.

2. The apparatus of claim 1, wherein the diffusing metal forms a coating layer disposed between the heatsink layer and the write pole.

3. The apparatus of claim 1, wherein the diffusing metal is disposed in the heatsink layer as an alloy of a metal and the diffusing metal.

4. The apparatus of claim 3, wherein the heatsink layer comprises at most 10% of the diffusing metal.

5. The apparatus of claim 3, wherein the heatsink layer is disposed on the write pole.

6. The apparatus of claim 1, wherein the diffusing metal is at least one of aluminum, chromium, titanium, and tantalum.

7. The apparatus of claim 2, wherein the coating layer covers the circumference of the write pole tip.

8. The apparatus of claim 2, wherein the coating layer is recessed from the slider media-facing surface.

9. The apparatus of claim 8, further comprising a blocking material positioned between the coating layer and the slider media-facing surface.

10. An apparatus, comprising:
a slider having a media-facing surface and configured for heat-assisted magnetic recording, the slider comprising:
   a write pole including two or more sides extending into the slider and a pole tip at the media-facing surface;
   a heatsink layer proximate at least part of the two or more sides where a first portion of the heatsink layer is proximate the pole tip;
   a diffusing metal disposed proximate the write pole; and
   a barrier layer on the media-facing surface, the barrier layer covering at least one of the first portion of the heatsink layer and the pole tip on the media-facing surface.

11. The apparatus of claim 10, wherein the diffusing metal is at least one of aluminum, chromium, titanium, and tantalum.

12. The apparatus of claim 10, wherein the diffusing metal forms a coating layer disposed between the heatsink layer and the write pole.

13. The apparatus of claim 10, wherein the diffusing metal is disposed in the heatsink layer as an alloy of a metal and the diffusing metal.

14. The apparatus of claim 13, wherein the heatsink layer comprises at most 10% of the diffusing metal.

15. The apparatus of claim 12, wherein the coating layer comprises a first portion recessed from the slider media-facing surface and a second portion comprising a blocking material positioned between the first portion and the slider media-facing surface.

16. The apparatus of claim 10, wherein the barrier layer has a thickness of about 3-5 nm.

17. The apparatus of claim 10, wherein the barrier layer covers the first portion of the heatsink layer and the pole tip.

18. An apparatus, comprising:
a slider having a media-facing surface and configured for heat-assisted magnetic recording, the slider comprising:
   a write pole including two or more sides extending into the slider and a pole tip at the media-facing surface;
   a coating layer comprising a diffusing metal and disposed on at least part of the two or more sides where a first portion of the coating layer comprises a blocking material and is disposed proximate the pole tip;
   a heatsink layer surrounding the coating layer and the write pole;
   a protective coating covering at least a portion of the media-facing surface, wherein the protective coating degrades during operation of the slider exposing the pole tip and heatsink layer; and a barrier layer on the media-facing surface, the barrier layer covering the exposed pole tip.

19. The apparatus of claim 18, wherein the barrier layer has a thickness of about 3-5 nm.

20. The apparatus of claim 18, wherein the barrier layer covers the heatsink layer and the coating layer.

* * * * *